US011038923B2

(12) United States Patent
Bykampadi et al.

(10) Patent No.: US 11,038,923 B2
(45) Date of Patent: Jun. 15, 2021

(54) SECURITY MANAGEMENT IN COMMUNICATION SYSTEMS WITH SECURITY-BASED ARCHITECTURE USING APPLICATION LAYER SECURITY

(71) Applicant: Nokia Technologies Oy, Espoo (FI)

(72) Inventors: Nagendra S. Bykampadi, Bangalore (IN); Suresh P. Nair, Whippany, NJ (US); Anja Jerichow, Munich (DE)

(73) Assignee: Nokia Technologies Oy, Espoo (FI)

( * ) Notice: Subject to any disclaimer, the term of this patent is extended or adjusted under 35 U.S.C. 154(b) by 223 days.

(21) Appl. No.: 16/014,262

(22) Filed: Jun. 21, 2018

(65) Prior Publication Data
US 2019/0260803 A1    Aug. 22, 2019

(30) Foreign Application Priority Data

Feb. 16, 2018  (IN) .............................. 201841005901

(51) Int. Cl.
*H04L 29/06* (2006.01)
*H04W 12/10* (2021.01)
(Continued)

(52) U.S. Cl.
CPC ............ *H04L 63/20* (2013.01); *H04L 9/0838* (2013.01); *H04L 41/0806* (2013.01);
(Continued)

(58) Field of Classification Search
CPC . H04L 63/20; H04L 63/0227; H04L 63/0281; H04L 63/168; H04L 9/0838;
(Continued)

(56) References Cited

U.S. PATENT DOCUMENTS 7,373,660 B1 *  5/2008  Guichard ................ H04L 47/10
                                                      726/15
7,870,604 B1 *  1/2011  Guichard ................ H04L 63/20
                                                      726/15
(Continued)

FOREIGN PATENT DOCUMENTS

WO  PCT/FI2019/050105    2/2019

OTHER PUBLICATIONS

Michael Walker, On the Security of 3GPP Networks, Eurocrypt 2000 (Year: 2000).*

(Continued)

*Primary Examiner* — Kambiz Zand
*Assistant Examiner* — Mahabub S Ahmed
(74) *Attorney, Agent, or Firm* — Ryan, Mason & Lewis, LLP

(57) ABSTRACT

In a communication system comprising a first network operatively coupled to a second network, wherein the first network comprises a first security edge protection proxy element operatively coupled to a second security edge protection proxy element of the second network; the method comprises configuring at least a given one of the first and second security edge protection proxy elements to apply application layer security to one or more information elements in a received message from a network function before sending the message to the other one of the first and second security edge protection proxy elements.

20 Claims, 5 Drawing Sheets

(51) Int. Cl.
*H04W 12/02* (2009.01)
*H04L 29/08* (2006.01)
*H04L 9/08* (2006.01)
*H04L 12/24* (2006.01)

(52) U.S. Cl.
CPC ...... *H04L 63/0227* (2013.01); *H04L 63/0281* (2013.01); *H04L 63/168* (2013.01); *H04L 67/12* (2013.01); *H04L 67/30* (2013.01); *H04W 12/02* (2013.01); *H04W 12/10* (2013.01)

(58) Field of Classification Search
CPC ..... H04L 41/0806; H04L 67/12; H04L 67/30; H04L 9/32; H04L 9/06; H04L 29/06; H04W 12/02; H04W 12/10; H04W 12/06; H04W 12/08; H04W 12/00; G06F 21/22
USPC .......................................................... 726/1
See application file for complete search history.

(56) References Cited

U.S. PATENT DOCUMENTS

| | | | | |
|---|---|---|---|---|
| 8,074,270 | B1* | 12/2011 | Lordello | H04L 45/52 726/15 |
| 8,185,933 | B1* | 5/2012 | Palmer | G06F 21/445 726/1 |
| 8,875,223 | B1* | 10/2014 | Chen | G06F 21/6272 726/1 |
| 9,060,263 | B1* | 6/2015 | Carames | H04W 8/06 |
| 9,094,407 | B1* | 7/2015 | Matthieu | H04L 63/102 |
| 9,172,559 | B2* | 10/2015 | Chen | H04L 12/66 |
| 9,300,635 | B1* | 3/2016 | Gilde | H04L 63/0281 |
| 9,369,430 | B2* | 6/2016 | Dahlin | H04L 61/2596 |
| 9,515,976 | B2* | 12/2016 | Talwar | H04W 4/14 |
| 9,712,386 | B1* | 7/2017 | Chen | H04L 41/0893 |
| 9,893,883 | B1* | 2/2018 | Chaubey | H04L 63/061 |
| 10,070,344 | B1* | 9/2018 | Dowlatkhah | H04W 28/16 |
| 10,122,577 | B1* | 11/2018 | Rykowski | H04L 41/0806 |
| 10,251,210 | B2* | 4/2019 | De Kievit | H04L 63/02 |
| 10,484,331 | B1* | 11/2019 | Rossman | H04L 63/1491 |
| 10,511,573 | B2* | 12/2019 | Larson | H04L 29/12801 |
| 2004/0210766 | A1* | 10/2004 | Kroselberg | H04L 63/164 726/26 |
| 2004/0268149 | A1* | 12/2004 | Aaron | H04L 63/08 726/11 |
| 2005/0243799 | A1* | 11/2005 | Saaskilahti | H04L 12/2854 370/352 |
| 2006/0064751 | A1* | 3/2006 | Ahuja | H04L 63/105 726/14 |
| 2006/0259628 | A1* | 11/2006 | Vadlapudi | H04W 28/24 709/227 |
| 2007/0127418 | A1* | 6/2007 | Pekkala | H04L 63/20 370/338 |
| 2007/0199060 | A1* | 8/2007 | Touboul | H04L 63/0263 726/11 |
| 2009/0067440 | A1* | 3/2009 | Chadda | H04L 45/74 370/401 |
| 2009/0304010 | A1* | 12/2009 | Kurebayashi | H04L 41/0806 370/401 |
| 2010/0111307 | A1* | 5/2010 | Hu | H04L 63/061 380/277 |
| 2010/0138895 | A1* | 6/2010 | Bouchat | H04L 63/102 726/1 |
| 2010/0238837 | A1* | 9/2010 | Zheng | H04L 12/4679 370/254 |
| 2012/0089707 | A1* | 4/2012 | Baba | H04L 41/0806 709/220 |
| 2012/0102541 | A1* | 4/2012 | Groskop | G06F 21/577 726/1 |
| 2013/0021946 | A1* | 1/2013 | Pan | H04L 67/12 370/254 |
| 2013/0055343 | A1* | 2/2013 | de los Reyes | H04L 63/1416 726/1 |
| 2014/0133354 | A1* | 5/2014 | Scharf | H04L 45/42 370/254 |
| 2014/0304777 | A1* | 10/2014 | Lehtovirta | H04L 63/164 726/3 |
| 2015/0012964 | A1* | 1/2015 | Xie | H04L 63/20 726/1 |
| 2015/0100673 | A1* | 4/2015 | Asati | H04L 12/4641 709/221 |
| 2015/0208240 | A1* | 7/2015 | Yang | H04L 9/0891 726/6 |
| 2015/0304354 | A1* | 10/2015 | Rogers | H04L 63/0209 726/1 |
| 2016/0029213 | A1* | 1/2016 | Rajadurai | H04W 76/11 380/283 |
| 2016/0036861 | A1* | 2/2016 | Mattes | H04L 63/20 726/1 |
| 2016/0134565 | A1* | 5/2016 | Vohra | H04L 41/0806 370/401 |
| 2016/0143070 | A1* | 5/2016 | Liyanage | H04L 63/0428 370/329 |
| 2016/0156596 | A1* | 6/2016 | Chen | H04L 67/32 713/168 |
| 2016/0285854 | A1* | 9/2016 | Hu | G08B 13/22 |
| 2017/0104723 | A1* | 4/2017 | Merritt | H04L 9/06 |
| 2017/0104755 | A1* | 4/2017 | Arregoces | H04L 63/102 |
| 2017/0141926 | A1* | 5/2017 | Xu | H04L 9/3263 |
| 2017/0265246 | A1* | 9/2017 | De Kievit | H04L 63/20 |
| 2017/0324566 | A1* | 11/2017 | Kawasaki | H04L 63/0272 |
| 2017/0346854 | A1* | 11/2017 | Kumar | H04W 12/02 |
| 2017/0353494 | A1* | 12/2017 | Krinos | H04L 63/20 |
| 2017/0366408 | A1* | 12/2017 | Kyllonen | H04L 41/12 |
| 2018/0004582 | A1* | 1/2018 | Hallenst L | G06F 16/252 |
| 2018/0139191 | A1* | 5/2018 | Shi | H04L 12/4641 |
| 2018/0227271 | A1* | 8/2018 | Cartigny | H04L 63/0227 |
| 2018/0241669 | A1* | 8/2018 | Muscariello | H04L 63/10 |
| 2018/0262500 | A1* | 9/2018 | De Kievit | H04W 12/084 |
| 2018/0270877 | A1* | 9/2018 | Lee | H04W 48/16 |
| 2018/0288179 | A1* | 10/2018 | Bhatia | H04L 67/28 |
| 2018/0316767 | A1* | 11/2018 | Jalan | H04L 63/1466 |
| 2019/0141015 | A1* | 5/2019 | Nellen | H04L 61/1511 |
| 2019/0158282 | A1* | 5/2019 | Liu | H04L 9/0891 |
| 2019/0215303 | A1* | 7/2019 | Appala | H04L 63/104 |
| 2019/0223250 | A1* | 7/2019 | Dao | H04W 76/40 |
| 2019/0394792 | A1* | 12/2019 | Jeon | H04W 16/14 |
| 2020/0036837 | A1* | 1/2020 | Lu | H04W 4/70 |
| 2020/0053802 | A1* | 2/2020 | Li | H04L 41/5077 |
| 2020/0120458 | A1* | 4/2020 | Aldana | H04W 28/22 |

OTHER PUBLICATIONS

3GPP, "3rd Generation Partnership Project; Technical Specification Group Services and System Aspects; System Architecture for the 5G System; Stage 2 (Release 15)," 3GPP TS 23.501, V15.0.0, Dec. 2017, 181 pages.
3GPP, "3rd Generation Partnership Project; Technical Specification Group Services and System Aspects; Security Architecture and Procedures for 5G System (Release 15)," 3GPP TS 33.501, V0.7.0, Jan. 2018, 109 pages.
D. Hardt, Ed., "The OAuth 2.0 Authorization Framework," Internet Engineering Task Force (IETF) Request for Comments: 6749, https://tools.ietf.org/html/rfc6749, Oct. 2012, 77 pages.
M. Jones et al., "JSON Web Token (JWT)," Internet Engineering Task Force (IETF) Request for Comments: 7519, https://tools.ietf.org/html/rfc7519, May 2015, 31 pages.
M. Jones et al., "JSON Web Signature (JWS)," Internet Engineering Task Force (IETF) Request for Comments: 7515, https://tools.ietf.org/html/rfc7515, May 2015, 60 pages.
M. Jones et al., "JSON Web Encryption (JWE)," Internet Engineering Task Force (IETF) Request for Comments: 7516, https://tools.ietf.org/html/rfc7516, May 2015, 52 pages.
M. Jones et al., "The OAuth 2.0 Authorization Framework: Bearer Token Usage," Internet Engineering Task Force (IETF) Request for Comments: 6750, https://tools.ietf.org/html/rfc6750, Oct. 2012, 19 pages.

(56) References Cited

OTHER PUBLICATIONS

Tim, "Analysis of Different Approaches for Implementing SBA Security Over N32 Reference Point," 3rd Generation Partnership Project (3GPP) TSG SA WG3 (Security), Meeting #90, Gothenburg, Sweden, Jan. 22-26, 2018, 5 pages.
Hans Christian Rudolph, S3-180389, "LS on SBI Design and Its Security Implications." 3rd Generation Partnership Project (3GPP) TSG-CT WG3 (Security), Meeting #94, Gothenburg, Sweden, Jan. 22-26, 2018, 3 pages.
Deutsche Telekom, "Inter Operator Signalling Security in 5G Proposal," 3rd Generation Partnership Project (3GPP) TSG SA WG3 (Security), Meeting #90, Gothenburg, Sweden, Jan. 22-26, 2018, 5 pages.
Ericsson, "Comment Contribution to S3-180223 (LS to CT3 CT4 on SBI Design and Its Security Implications)," 3rd Generation Partnership Project (3GPP) TSG SA WG3 (Security), Meeting #90, Gothenburg, Sweden, Jan. 22-26, 2018, 5 pages.

\* cited by examiner

SECURITY MANAGEMENT IN COMMUNICATION SYSTEMS WITH SECURITY-BASED ARCHITECTURE USING APPLICATION LAYER SECURITY

FIELD

The field relates generally to communication systems, and more particularly, but not exclusively, to security management within such systems.

BACKGROUND

This section introduces aspects that may be helpful to facilitating a better understanding of the inventions. Accordingly, the statements of this section are to be read in this light and are not to be understood as admissions about what is in the prior art or what is not in the prior art.

Fourth generation (4G) wireless mobile telecommunications technology, also known as Long Term Evolution (LTE) technology, was designed to provide high capacity mobile multimedia with high data rates particularly for human interaction. Next generation or fifth generation (5G) technology is intended to be used not only for human interaction, but also for machine type communications in so-called Internet of Things (IoT) networks.

While 5G networks are intended to enable massive IoT services (e.g., very large numbers of limited capacity devices) and mission-critical IoT services (e.g., requiring high reliability), improvements over legacy mobile communication services are supported in the form of enhanced mobile broadband (eMBB) services providing improved wireless Internet access for mobile devices.

In an example communication system, user equipment (5G UE in a 5G network or, more broadly, a UE) such as a mobile terminal (subscriber) communicates over an air interface with a base station or access point referred to as a gNB in a 5G network. The access point (e.g., gNB) is illustratively part of an access network of the communication system. For example, in a 5G network, the access network is referred to as a 5G System and is described in 5G Technical Specification (TS) 23.501, V15.0.0, entitled "Technical Specification Group Services and System Aspects; System Architecture for the 5G System," the disclosure of which is incorporated by reference herein in its entirety. In general, the access point (e.g., gNB) provides access for the UE to a core network (CN), which then provides access for the UE to other UEs and/or a data network such as a packet data network (e.g., Internet).

TS 23.501 goes on to define a 5G Service-Based Architecture (SBA) which models services as network functions (NFs) that communicate with each other using representational state transfer application programming interfaces (Restful APIs).

Furthermore, 5G Technical Specification (TS) 33.501, V0.7.0, entitled "Technical Specification Group Services and System Aspects; Security Architecture and Procedures for the 5G System," the disclosure of which is incorporated by reference herein in its entirety, further describes security management details associated with a 5G network.

Security management is an important consideration in any communication system. However, due to continuing attempts to improve the architectures and protocols associated with a 5G network in order to increase network efficiency and/or subscriber convenience, security management issues can present a significant challenge.

SUMMARY

Illustrative embodiments provide improved techniques for security management in communication systems.

For example, in one illustrative embodiment, a method comprises the following step. In a communication system comprising a first network operatively coupled to a second network, wherein the first network comprises a first security edge protection proxy element operatively coupled to a second security edge protection proxy element of the second network; the method comprises configuring at least a given one of the first and second security edge protection proxy elements to apply application layer security to one or more information elements in a received message from a network function before sending the message to the other one of the first and second security edge protection proxy elements.

Further, in one or more illustrative embodiments, the given security edge protection proxy element identifies an indicator in the received message from the network function, wherein the indicator is set by the network function to specify at least one security operation to be applied to the one or more information elements. Alternatively, the given security edge protection proxy element is provisioned with configuration information that enables the given security edge protection proxy element to self-identify at least one security operation to be applied to at least one information element in a received message.

In other illustrative embodiments, the given security edge protection proxy element is configured to one or more of: select a protection scheme based on the content of the one or more information elements; negotiate a security profile with the other security edge protection proxy element; and perform security key agreement operations with the other security edge protection proxy element to agree on one or more keys for application layer security.

Further illustrative embodiments are provided in the form of non-transitory computer-readable storage medium having embodied therein executable program code that when executed by a processor causes the processor to perform the above steps. Still further illustrative embodiments comprise apparatus with a processor and a memory configured to perform the above steps.

These and other features and advantages of embodiments described herein will become more apparent from the accompanying drawings and the following detailed description.

DETAILED DESCRIPTION

Embodiments will be illustrated herein in conjunction with example communication systems and associated techniques for providing security management in communication systems. It should be understood, however, that the scope of the claims is not limited to particular types of communication systems and/or processes disclosed. Embodiments can be implemented in a wide variety of other types of communication systems, using alternative processes and operations. For example, although illustrated in the context of wireless cellular systems utilizing 3GPP system elements such as a 3GPP next generation system (5G), the disclosed embodiments can be adapted in a straightforward manner to a variety of other types of communication systems.

In accordance with illustrative embodiments implemented in a 5G communication system environment, one or more 3GPP technical specifications (TS) and technical reports (TR) may provide further explanation of network elements/functions and/or operations that may interact with parts of the inventive solutions, e.g., the above-referenced 3GPP TS 23.501 and 3GPP TS 33.501. Other 3GPP TS/TR documents may provide other conventional details that one of ordinary skill in the art will realize. However, while well-suited for 5G-related 3GPP standards, embodiments are not necessarily intended to be limited to any particular standards.

Illustrative embodiments are related to security management associated with the Service-Based Architecture (SBA) for 5G networks. Prior to describing such illustrative embodiments, a general description of main components of a 5G network will be described below in the context of FIGS. 1 and 2.

Figure 1:
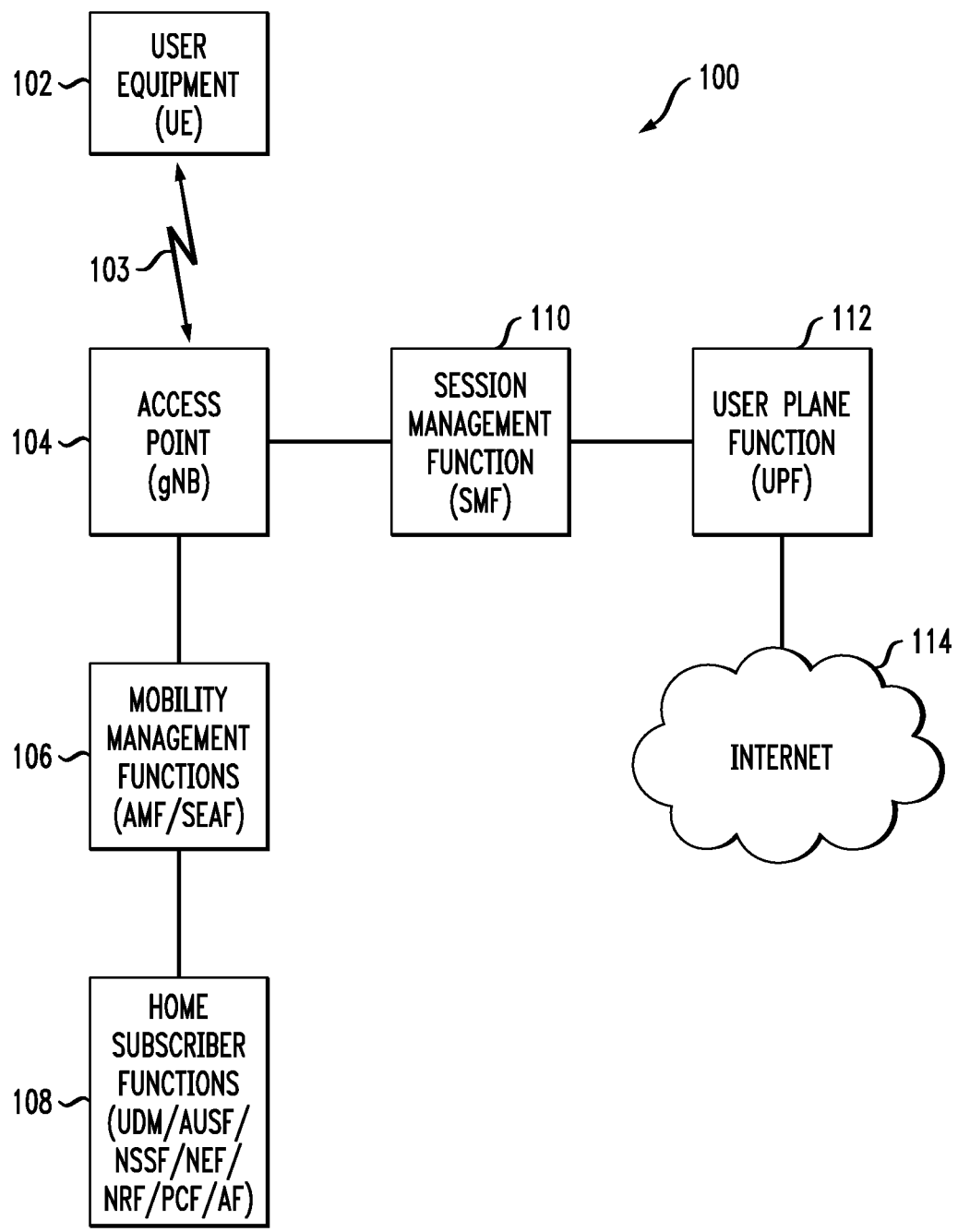
FIG. 1 illustrates a communication system with which one or more illustrative embodiments may be implemented.

FIG. 1 shows a communication system 100 within which illustrative embodiments are implemented. It is to be understood that the elements shown in communication system 100 are intended to represent main functions provided within the system, e.g., UE access functions, mobility management functions, authentication functions, serving gateway functions, etc. As such, the blocks shown in FIG. 1 reference specific elements in 5G networks that provide these main functions. However, other network elements may be used to implement some or all of the main functions represented. Also, it is to be understood that not all functions of a 5G network are depicted in FIG. 1. Rather, functions that facilitate an explanation of illustrative embodiments are represented. Subsequent figures may depict some additional elements/functions.

Accordingly, as shown, communication system 100 comprises user equipment (UE) 102 that communicates via an air interface 103 with an access point (gNB) 104. The UE 102 may be a mobile station, and such a mobile station may comprise, by way of example, a mobile telephone, a computer, or any other type of communication device. The term "user equipment" as used herein is therefore intended to be construed broadly, so as to encompass a variety of different types of mobile stations, subscriber stations or, more generally, communication devices, including examples such as a combination of a data card inserted in a laptop or other equipment such as a smart phone. Such communication devices are also intended to encompass devices commonly referred to as access terminals.

In one embodiment, UE 102 is comprised of a Universal Integrated Circuit Card (UICC) part and a Mobile Equipment (ME) part. The UICC is the user-dependent part of the UE and contains at least one Universal Subscriber Identity Module (USIM) and appropriate application software. The USIM securely stores the permanent subscription identifier and its related key, which are used to identify and authenticate subscribers to access networks. The ME is the user-independent part of the UE and contains terminal equipment (TE) functions and various mobile termination (MT) functions.

Note that, in one example, the permanent subscription identifier is an International Mobile Subscriber Identity (IMSI) of a UE. In one embodiment, the IMSI is a fixed 15-digit length and consists of a 3-digit Mobile Country Code (MCC), a 3-digit Mobile Network Code (MNC), and a 9-digit Mobile Station Identification Number (MSIN). In a 5G communication system, an IMSI is referred to as a Subscription Permanent Identifier (SUPI). In the case of an IMSI as a SUPI, the MSIN provides the subscriber identity. Thus, only the MSIN portion of the IMSI typically needs to be encrypted. The MNC and MCC portions of the IMSI provide routing information, used by the serving network to route to the correct home network. When the MSIN of a SUPI is encrypted, it is referred to as Subscription Concealed Identifier (SUCI).

The access point 104 is illustratively part of an access network of the communication system 100. Such an access network may comprise, for example, a 5G System having a plurality of base stations and one or more associated radio network control functions. The base stations and radio network control functions may be logically separate entities, but in a given embodiment may be implemented in the same physical network element, such as, for example, a base station router or femto cellular access point.

The access point 104 in this illustrative embodiment is operatively coupled to mobility management functions 106. In a 5G network, the mobility management function is implemented by an Access and Mobility Management Function (AMF). A Security Anchor Function (SEAF) can also be implemented with the AMF connecting a UE with the mobility management function. A mobility management function, as used herein, is the element or function (i.e., entity) in the core network (CN) part of the communication system that manages or otherwise participates in, among other network operations, access and mobility (including authentication/authorization) operations with the UE (through the access point 104). The AMF may also be referred to herein, more generally, as an access and mobility management entity.

The AMF 106 in this illustrative embodiment is operatively coupled to home subscriber functions 108, i.e., one or more functions that are resident in the home network of the subscriber. As shown, some of these functions include the Unified Data Management (UDM) function, as well as an Authentication Server Function (AUSF). The AUSF and UDM (separately or collectively) may also be referred to herein, more generally, as an authentication entity. In addition, home subscriber functions may include, but are not limited to, Network Slice Selection Function (NSSF), Network Exposure Function (NEF), Network Repository Function (NRF), Policy Control Function (PCF), and Application Function (AF).

The access point 104 is also operatively coupled to a serving gateway function, i.e., Session Management Function (SMF) 110, which is operatively coupled to a User Plane Function (UPF) 112. UPF 112 is operatively coupled to a Packet Data Network, e.g., Internet 114. Further typical operations and functions of such network elements are not described here since they are not the focus of the illustrative embodiments and may be found in appropriate 3GPP 5G documentation.

It is to be appreciated that this particular arrangement of system elements is an example only, and other types and arrangements of additional or alternative elements can be used to implement a communication system in other embodiments. For example, in other embodiments, the system 100 may comprise other elements/functions not expressly shown herein.

Accordingly, the FIG. 1 arrangement is just one example configuration of a wireless cellular system, and numerous alternative configurations of system elements may be used. For example, although only single elements/functions are shown in the FIG. 1 embodiment, this is for simplicity and clarity of description only. A given alternative embodiment may of course include larger numbers of such system elements, as well as additional or alternative elements of a type commonly associated with conventional system implementations.

It is also to be noted that while FIG. 1 illustrates system elements as singular functional blocks, the various subnetworks that make up the 5G network are partitioned into so-called network slices. Network slices (network partitions) comprise a series of network function (NF) sets (i.e., function chains) for each corresponding service type using network function virtualization (NFV) on a common physical infrastructure. The network slices are instantiated as needed for a given service, e.g., eMBB service, massive IoT service, and mission-critical IoT service. A network slice or function is thus instantiated when an instance of that network slice or function is created. In some embodiments, this involves installing or otherwise running the network slice or function on one or more host devices of the underlying physical infrastructure. UE 102 is configured to access one or more of these services via gNB 104.

Figure 2:
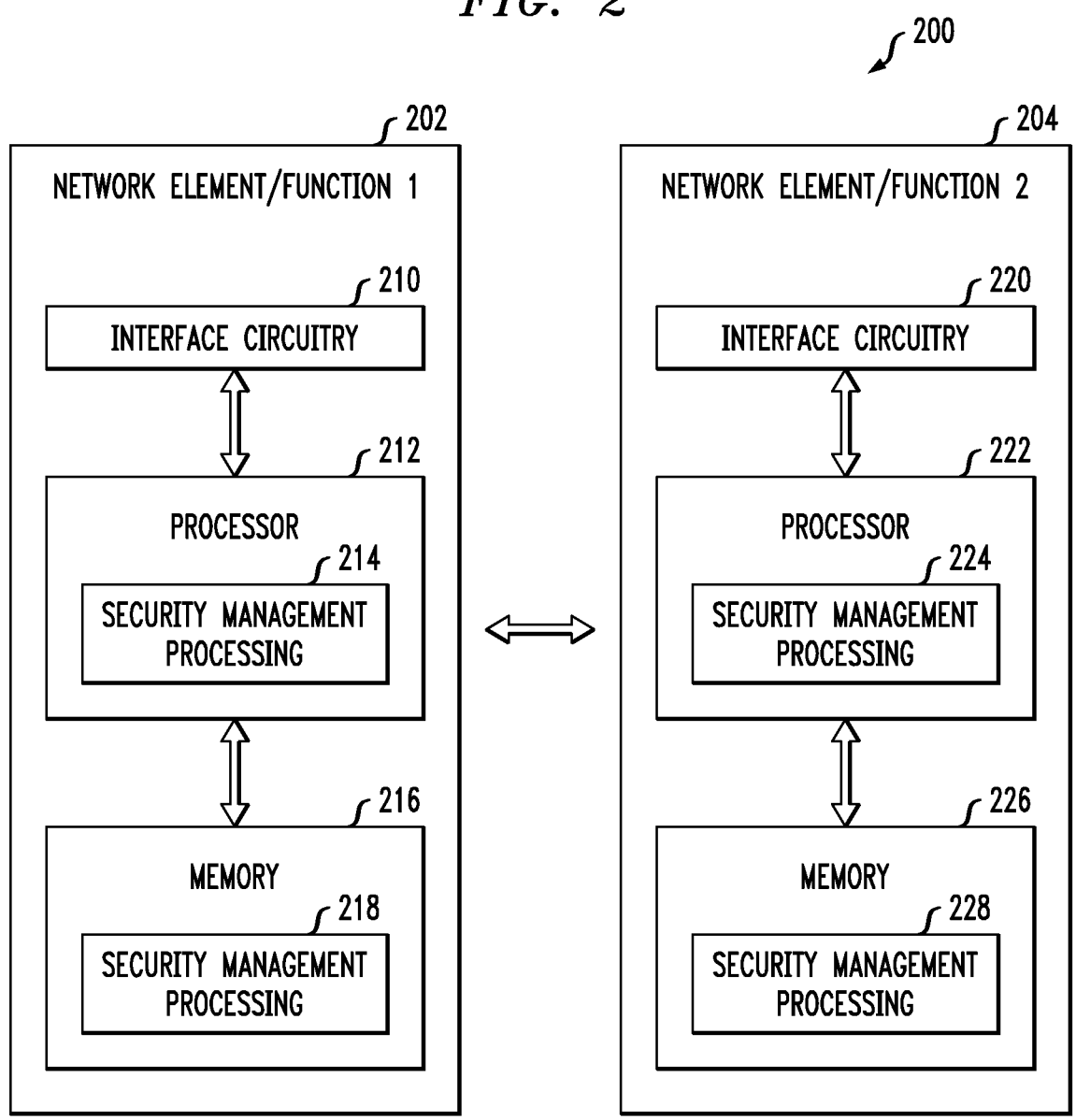
FIG. 2 illustrates network elements/functions for providing security management with which one or more illustrative embodiments may be implemented.

FIG. 2 is a block diagram of network elements/functions for providing security management in an illustrative embodiment. System 200 is shown comprising a first network element/function 202 and a second network element/function 204. It is to be appreciated that the network elements/functions 202 and 204 represent any network elements/functions that are configured to provide security management and other techniques described herein, for example, but not limited to, AMF, SEAF, UDM, AUSF, NSSF, NEF, NRF, PCF and AF. Further, one or both of the first network element/function 202 and the second network element/function 204 may be a Security Edge Protection Proxy (SEPP), which will be described in further detail below.

The network element/function 202 comprises a processor 212 coupled to a memory 216 and interface circuitry 210. The processor 212 of the network element/function 202 includes a security management processing module 214 that may be implemented at least in part in the form of software executed by the processor. The processing module 214 performs security management described in conjunction with subsequent figures and otherwise herein. The memory 216 of the network element/function 202 includes a security management storage module 218 that stores data generated or otherwise used during security management operations.

The network element/function 204 comprises a processor 222 coupled to a memory 226 and interface circuitry 220. The processor 222 of the network element/function 204 includes a security management processing module 224 that may be implemented at least in part in the form of software executed by the processor 222. The processing module 224 performs security management described in conjunction with subsequent figures and otherwise herein. The memory 226 of the network element/function 204 includes a security management storage module 228 that stores data generated or otherwise used during security management operations.

The processors 212 and 222 of the respective network elements/functions 202 and 204 may comprise, for example, microprocessors, application-specific integrated circuits (ASICs), field programmable gate arrays (FPGAs), digital signal processors (DSPs) or other types of processing devices or integrated circuits, as well as portions or combinations of such elements. Such integrated circuit devices, as well as portions or combinations thereof, are examples of "circuitry" as that term is used herein. A wide variety of other arrangements of hardware and associated software or firmware may be used in implementing the illustrative embodiments.

The memories 216 and 226 of the respective network elements/functions 202 and 204 may be used to store one or more software programs that are executed by the respective processors 212 and 222 to implement at least a portion of the functionality described herein. For example, security management operations and other functionality as described in conjunction with subsequent figures and otherwise herein may be implemented in a straightforward manner using software code executed by processors 212 and 222.

A given one of the memories 216 or 226 may therefore be viewed as an example of what is more generally referred to herein as a computer program product or still more generally as a processor-readable storage medium that has executable program code embodied therein. Other examples of processor-readable storage media may include disks or other types of magnetic or optical media, in any combination. Illustrative embodiments can include articles of manufacture comprising such computer program products or other processor-readable storage media.

The memory 216 or 226 may more particularly comprise, for example, an electronic random access memory (RAM) such as static RAM (SRAM), dynamic RAM (DRAM) or other types of volatile or non-volatile electronic memory. The latter may include, for example, non-volatile memories such as flash memory, magnetic RAM (MRAM), phase-change RAM (PC-RAM) or ferroelectric RAM (FRAM). The term "memory" as used herein is intended to be broadly construed, and may additionally or alternatively encompass, for example, a read-only memory (ROM), a disk-based memory, or other type of storage device, as well as portions or combinations of such devices.

The interface circuitries 210 and 220 of the respective network elements/functions 202 and 204 illustratively comprise transceivers or other communication hardware or firmware that allows the associated system elements to communicate with one another in the manner described herein.

It is apparent from FIG. 2 that network element/function 202 is configured for communication with network element/function 204 and vice-versa via their respective interface circuitries 210 and 220. This communication involves network element/function 202 sending data to the network element/function 204, and the network element/function 204 sending data to the network element/function 202. However, in alternative embodiments, other network elements may be operatively coupled between the network elements/functions 202 and 204. The term "data" as used herein is intended to be construed broadly, so as to encompass any type of information that may be sent between network elements/functions (as well as between user equipment and a core network) including, but not limited to, messages, identifiers, keys, indicators, user data, control data, etc.

It is to be appreciated that the particular arrangement of components shown in FIG. 2 is an example only, and numerous alternative configurations may be used in other embodiments. For example, any given network element/ function can be configured to incorporate additional or alternative components and to support other communication protocols.

Other system elements such as UE 102 and gNB 104 may each also be configured to include components such as a processor, memory and network interface. These elements need not be implemented on separate stand-alone processing platforms, but could instead, for example, represent different functional portions of a single common processing platform.

Given the general concepts described above, illustrative embodiments that address certain security management issues will now be described. More particularly, illustrative embodiments provide security management techniques for 5G systems. The architecture for 5G systems is currently being standardized in 3GPP. As mentioned above, the 3GPP TS 23.501 defines the 5G system architecture as service-based, e.g., Service-Based Architecture (SBA).

Figure 3:
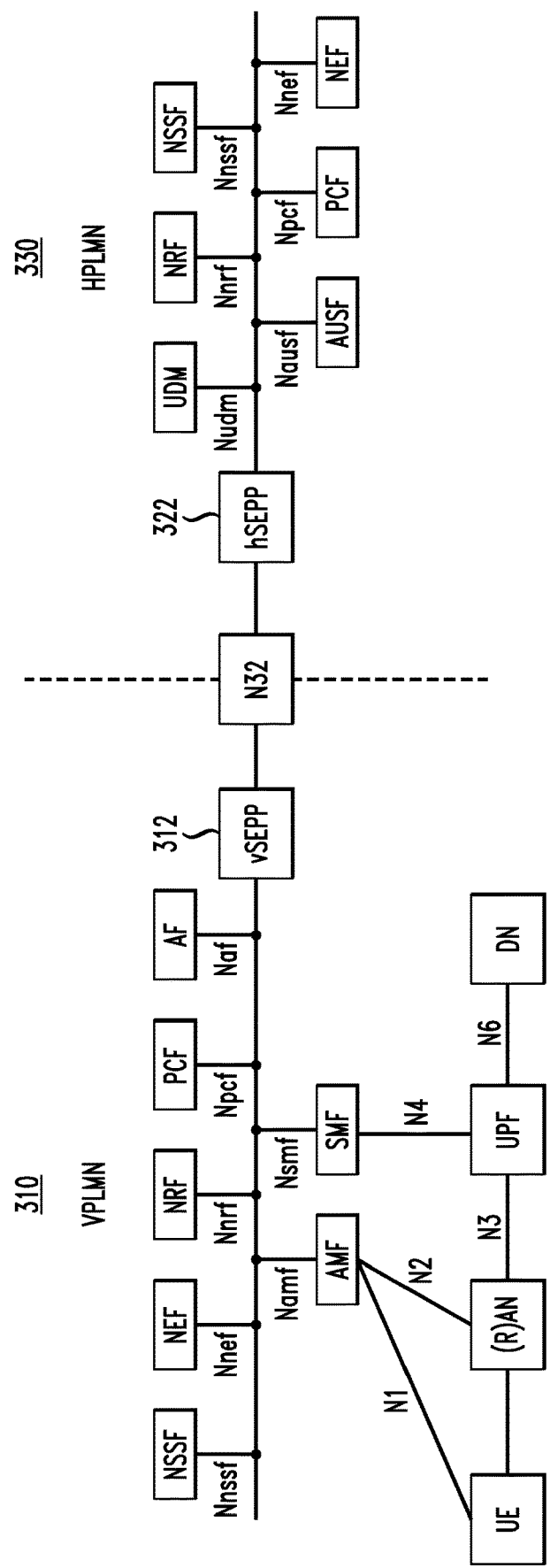
FIG. 3 illustrates a communication system architecture with security edge protection proxies between a visiting network and a home network with which one or more illustrative embodiments may be implemented.

FIG. 3 depicts a 5G architecture in a configuration comprising a visiting public land mobile network (VPLMN) 310 operatively coupled to a home public land mobile network (HPLMN) 320. More particularly, FIG. 3 illustrates the presence of a Security Edge Protection Proxy (SEPP) at the edge of each PLM network, i.e., vSEPP 312 in VPLMN 310 and hSEPP 322 in HPLMN 320. It is to be appreciated that the various network functions shown in the VPLMN 310 and the HPLMN 320 are known and described in detail in various 5G specifications such as, but not limited to, the above-referenced TS 23.501 and TS 33.501.

Thus, the SEPP is the entity that resides at the perimeter of the network and performs Application Layer Security (ALS) on information elements (IE) in HyperText Transport Protocol (HTTP) messages before the messages are sent externally over a roaming interface (e.g., N32). ALS is performed individually on each IE in the HTTP Request message using a standardized JavaScript Object Signing and Encryption (JOSE) framework.

However, each IE may require different security protection, for example, only some of the IEs in the message need encryption, some will need integrity-protection, etc. Therefore, it is realized herein that since IE may require different security protection, it is important for the SEPP to know how to treat each IE in the message received from the network function.

Identification of the IE and the required security mechanism to be applied on the IE is therefore a prerequisite step for the SEPP before it can apply security at the application layer.

As mentioned above, in 5G, SBA is introduced to model services as network functions (NFs) that communicate with each other using Restful APIs. In the scenario where the two communicating NFs are in two different PLMNs (e.g., VPLMN 310 and HPLMN 320), communication happens over the roaming interface between the two participating PLMNs.

To protect NF specific content in the messages that are sent over the roaming interface, 5G introduces SEPP as the entity residing at the perimeter of the PLMN network and acting as a gateway that protects all incoming and outgoing HTTP traffic over the N32 roaming interface. The SEPP implements application layer traffic for all the data exchanged between two NFs at the service layer.

The application layer traffic comprises all the IEs in the HTTP message payload and sensitive information in the HTTP message header. Not all the IEs get the same security treatment in SEPP. Some IEs require e2e encryption, some only require e2e integrity protection, while some IEs require e2e integrity protection but allows allow an intermediate IPX provider to manipulate these IEs. For example, some of the IEs include a permanent subscription identity (SUPI) of the UE or encrypted SUPI (SUCI), an IP address of the UE, an IP address of the NFs or their identifiers within a PLMN, Authentication Vectors (AVs) for the UE, subscription parameters of the UE, network slice subscription/eligibility parameters, location information of the UE, charging information or call data records, etc. Some of these IEs would need e2e encryption, while some need e2e integrity protection, and some others need both integrity and encryption.

As defined by 3GPP SA2, TS 23.501 clause 6.2.17, SEPP is a non-transparent proxy and supports the following functionality: (i) message filtering and policing on inter-PLMN control plane interfaces; and (ii) topology hiding.

SEPP behaves as a 'non-transparent' active proxy in that the NFs are aware of SEPP and send all inter-PLMN control plane traffic to SEPP. The connection between the NF and its local SEPP may be secured with transport layer security (TLS).

In the outgoing direction, i.e., from an NF (e.g., AMF in FIG. 3) within its PLMN (310) to the another PLMN (320):

(i) SEPP does topology hiding by not exposing any of the intra-PLMN IP addresses/topology information in the outgoing traffic.

(ii) In addition, SEPP secures all outgoing traffic by either securing all or some NF control plane traffic (i.e., JavaScript Object Notation (JSON)-based Information Elements (IEs) in the HTTP message payload) on its own or using TLS at the transport layer to secure all traffic.

(iii) Apart from this, SEPP can also implement identity hiding by securing SUPI information in the Request uniform resource identifier (URI) field of the HTTP Request line.

In the incoming direction, i.e., from the other PLMN to the NF within its PLMN:

(i) SEPP receives all the traffic addressed to it (as it is the proxy) and forwards the traffic to the correct NF based on the Request URI. In this process. SEPP restores the protected message to its original form before forwarding it to the correct NF.

(ii) SEPP performs access control by only allowing traffic from authorized/authenticated entities (i.e., peer SEPP on the other side of N32).

How to achieve this topology hiding, identity hiding from the Internetwork Packet Exchange (IPX) interconnect nodes between the two PLMNs (note that an IPX network can reside between VPLMN 310 and HPLMN 320, although not expressly shown in FIG. 3), and security for NF inter-PLMN control plane traffic is currently being considered.

Illustrative embodiments provide techniques for securing NF inter-PLMN control plane messaging, i.e., securing HTTP contents at the application layer.

In the scenario where the two communicating NFs are in two different PLMNs, e.g., FIG. 3, communication happens over the roaming interface (N32) between the two participating PLMNs. Hence, when NF content is exchanged between two NFs, if the two NFs belong to different PLMNs, SEPP must apply protection mechanisms to the sensitive contents.

In FIG. 3, an N32 reference point exists between two SEPPs, i.e., between vSEPP 312 and hSEPP 322. It is assumed that all network function traffic on this reference point must be protected with e2e encryption between the two communicating NFs.

In illustrative embodiments, SEPP performs application layer security by protecting the contents of the HTTP message payload along specific HTTP headers and parts of the HTTP Request including the Request-URI field.

It is realized herein that for an application layer security solution to be implemented in SEPP, there are the following broad areas that need to be addressed:

(i) How does SEPP learn about the IEs that require specific types of protection? For example, only a few of the IEs may require encryption. In other words, how does SEPP identify those IEs in the incoming HTTP Request?

(ii) While there is general agreement that JOSE framework will be used for protecting JSON-based IEs in the HTTP message payload, the following aspects are not solved:

a. Specific protection schemes that SEPP should implement before sending the message over on the N32 interface.

b. The proposed mechanism must further allow for enhancement when individual IEs can be modified by an IPX provider in transit. Also, ways for SEPP to detect modification by untrusted and unintended intermediary nodes.

(iii) How do two SEPPs agree on which security profiles to use for ciphering, integrity protection, etc. Also, there is a need to build support for renegotiation of these profiles between two SEPPs.

(iv) Key management aspects need to be specified for determining keys needed for application layer security.

Illustrative embodiments described below will address each of these challenges.

Identification and Security on Individual IEs

For 3GPP to meet Global System for Mobile Communications Association (GSMA) DESS Working Group recommendations on IPX network e2e security, SEPP needs to apply security on each IE separately. This helps in satisfying the following:

(i) Some IEs are required by GSMA to be available for modification by the IPX intermediary nodes while in transit. This implies that these IEs cannot be confidentiality protected but only integrity protected.

(ii) Sensitive information carried in IEs, such as Authentication Vectors, Extensible Authentication Protocol (EAP) keys, SUPI, etc., must be confidentiality protected.

This requires SEPP to be aware of each IE in the HTTP message and how it needs to be protected.

Figure 4A:
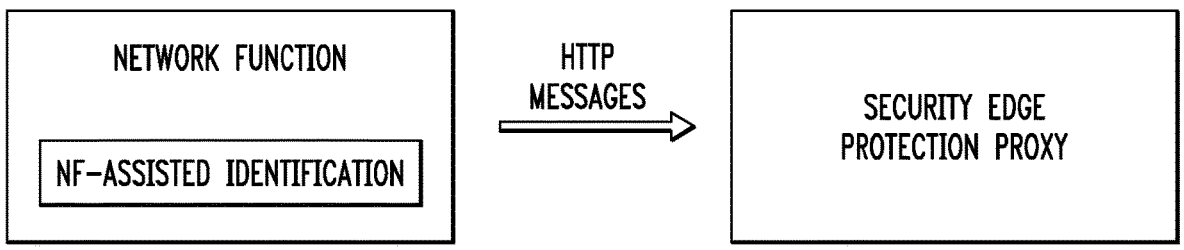
FIGS. 4A through 4E illustrate various functionalities with which one or more security edge protection proxies may be configured, according to one or more illustrative embodiments.

Illustrative embodiments provide multiple ways this issue can be solved:

(i) Network Function assisted identification (process 400 depicted in FIG. 4A): In this illustrative embodiment, the source NF itself indicates via flags/indicators how each IE must be secured in SEPP. SEPP uses these indicators to identify and apply appropriate protection on the IEs. In this illustrative embodiment, NF is aware of how each IE has to be secured and appropriately conveys that information to the SEPP. SEPP then executes the necessary security operation to protect the IE.

Figure 4B:
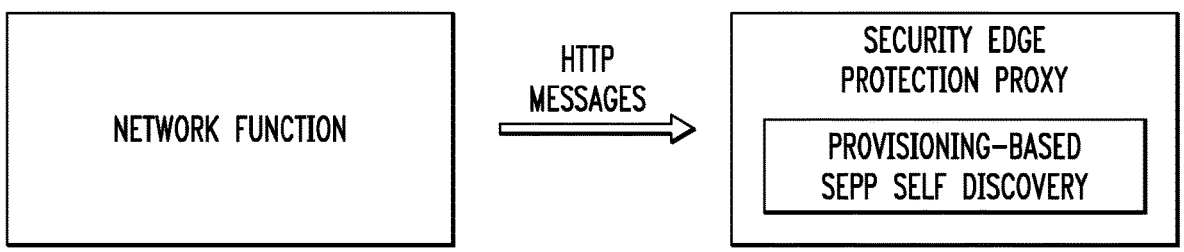

(ii) SEPP Self-discovery based on provisioning (process 410 depicted in FIG. 4B): In this illustrative embodiment, SEPP is provided with sufficient intelligence, that may be as a configuration file, to parse the IEs in the message and apply the necessary protection. Provisioning information captures all the necessary updates/changes to the APIs every release. In this illustrative embodiment, SEPP handles all security aspects. Network functions are completely security-unaware.

Protection Scheme

To allow for the trusted intermediary IPX nodes to see and possibly modify specific IEs in the HTTP message while completely protecting all sensitive information end to end between SEPPs, SEPP must implement application layer security in such a way that:

a) Sensitive information such as SUPI, Authentication Vectors, etc., are fully e2e confidentiality protected between two SEPPs. This ensures that no node in the IPX network can view IEs that are in-transit.

b) IEs that are subject to modification by the intermediary IPX node are integrity protected but can be modified in a verifiable way by authorized IPX nodes and any other modification by unauthorized IPX nodes are detectable by the receiving SEPP.

The HTTP message is expected to have multipart content that includes JSON IEs and binary blobs for specific type of data. In illustrative embodiments, the protection scheme in SEPP handles both types of content. For example, one or more illustrative embodiments map all content types in HTTP message into the JSON content type and apply the JOSE protection scheme on each JSON IE. This avoids the need to have different protection schemes for each content types.

In addition to the HTTP message contents, the Request-URI part of the HTTP Request line requires protection when it contains sensitive information such as the SUPI. Illustrative embodiments provide such protection.

Furthermore, certain HTTP header fields require protection when they are present. For example, Authorization header carries an OAuth bearer token. Illustrative embodiments confidentiality protect token this in SEPP.

Figure 4C:
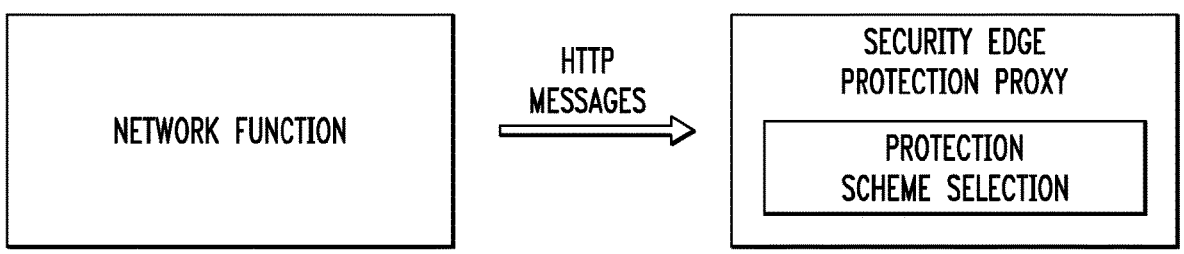

In summary, SEPP according to illustrative embodiments considers all parts of the HTTP message and applies protection as required. This is generally illustrated as process 420 in FIG. 4C.

Agreement Between two SEPPs on Cipher Suite to Use

Illustrative embodiments provide for two SEPPs in the two roaming networks to negotiate the cipher suite that will be used to protect HTTP messages in each SEPP.

Negotiation is carried out as part of the initialization sequence when the two SEPPs initially authenticate each other. Once authentication is complete, each SEPP shares its available cipher suites with the other SEPP. Eventually both agree on a cipher suite to use for confidentiality and integrity protection in SEPP.

Illustrative embodiments also provide a mechanism for a SEPP to trigger renegotiation of the cipher suite with the peer SEPP if so desired.

Figure 4D:
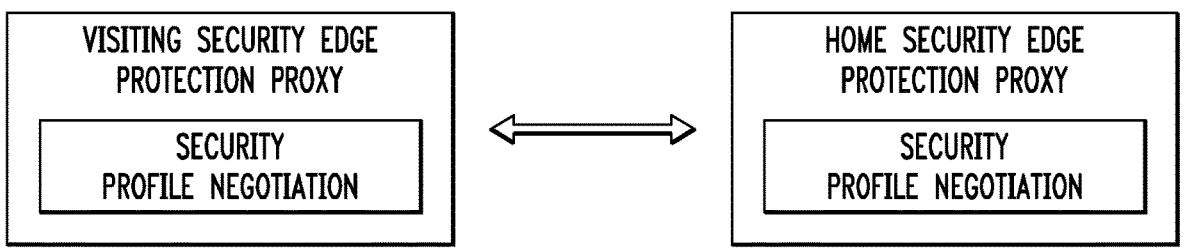

This negotiation (including initial negotiation and renegotiation) is generally illustrated as process 430 in FIG. 4D.

Key Management

In illustrative embodiments, both SEPPs are configured to agree on which keys to use and how these keys get established in them. This can occur in several ways:

1. A shared symmetric key is manually provisioned on both the SEPPs. SEPPs use the same key to protect all traffic on the N32 interface.

2. Key distribution algorithm is used to agree on a shared symmetric key—one for confidentiality protection, another one for integrity protection.

3. Public Key Infrastructure (PKI) certificates are used to protect all traffic. SEPPs use public key encryption and digital signatures to confidentiality protect and integrity protect respectively.

4. A randomly generated Content Encryption key (CEK) is used to confidentiality protect all traffic. PKI certificates used to protect CEK that is transferred along with the protected message. Digital signatures are used for integrity protection.

Figure 4E:
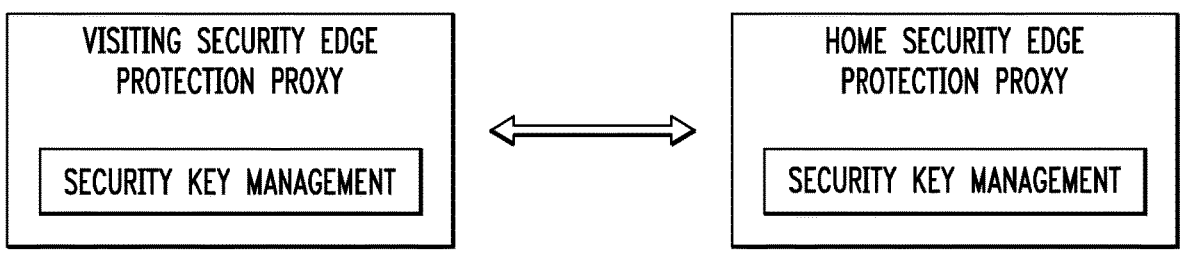

Key management functionalities in each SEPP are generally illustrated as process 440 in FIG. 4E.

It should therefore again be emphasized that the various embodiments described herein are presented by way of illustrative example only, and should not be construed as limiting the scope of the claims. For example, alternative embodiments can utilize different communication system configurations, user equipment configurations, base station configurations, key pair provisioning and usage processes, messaging protocols and message formats than those described above in the context of the illustrative embodiments. These and numerous other alternative embodiments within the scope of the appended claims will be readily apparent to those skilled in the art.

What is claimed is:

1. A method comprising:
    in a communication system comprising a first network operatively coupled to a second network, wherein the first network comprises a first security edge protection proxy element operatively coupled to a second security edge protection proxy element of the second network;
    configuring the first security edge protection proxy element to apply application layer security to one or more information elements in a received message from a network function before sending the message to the second security edge protection proxy element;
    wherein configuring the first security edge protection proxy element to apply application layer security to the one or more information elements in the received message comprises configuring the first security edge protection proxy element to apply different types of application layer security to different ones of the one or more information elements in the received message; and
    wherein applying different types of application layer security to different ones of the one or more information elements in the received message comprises (i) applying at least one of end-to-end encryption and a first type of end-to-end integrity protection to information elements of a first type and (ii) applying a second type of end-to-end integrity protection to information elements of the second type, the second type of end-to-end integrity protection permitting verifiable modification of the information elements of the second type by one or more authorized nodes in the second network.

2. The method of claim 1, wherein the configuring step further comprises enabling the first security edge protection proxy element to identify an indicator in the received message from the network function, wherein the indicator is set by the network function to specify at least one security operation to be applied to the one or more information elements.

3. The method of claim 1, wherein the configuring step further comprises provisioning the first security edge protection proxy element with configuration information that enables the first security edge protection proxy element to self-identify at least one security operation to be applied to at least one information element in a received message.

4. The method of claim 1, further comprising configuring the first security edge protection proxy element to select a protection scheme based on the content of the one or more information elements.

5. The method of claim 4, wherein the protection scheme comprises one or more of confidentiality protection and integrity protection.

6. The method of claim 1, further comprising configuring the first security edge protection proxy element to negotiate a security profile with the second security edge protection proxy element.

7. The method of claim 6, further comprising configuring the first security edge protection proxy element to renegotiate a security profile with the second security edge protection proxy element.

8. The method of claim 1, further comprising configuring the first security edge protection proxy element to perform key agreement operations with the second security edge protection proxy element to agree on one or more keys for application layer security.

9. The method of claim 8, wherein the one or more keys comprise one of more of a shared symmetric key, a content encryption key, and a public/private key pair.

10. The method of claim 1, wherein the received message is a HyperText Transport Protocol (HTTP) request message.

11. The method of claim 10, wherein a format of the HTTP request message utilizes a JavaScript Object Notation (JSON).

12. An article of manufacture comprising a non-transitory computer-readable storage medium having embodied therein executable program code that when executed by a processor causes the processor to perform the step of:
    in a communication system comprising a first network operatively coupled to a second network, wherein the first network comprises a first security edge protection proxy element operatively coupled to a second security edge protection proxy element of the second network;
    configuring the first security edge protection proxy element to apply application layer security to one or more information elements in a received message from a network function before sending the message to the second security edge protection proxy element;
    wherein configuring the first security edge protection proxy element to apply application layer security to the one or more information elements in the received message comprises configuring the first security edge protection proxy element to apply different types of application layer security to different ones of the one or more information elements in the received message; and
    wherein applying different types of application layer security to different ones of the one or more information elements in the received message comprises (i) applying at least one of end-to-end encryption and a first type of end-to-end integrity protection to information elements of a first type and (ii) applying a second type of end-to-end integrity protection to information elements of the second type, the second type of end-to-end integrity protection permitting verifiable modification of the information elements of the second type by one or more authorized nodes in the second network.

13. Apparatus comprising:
    in a communication system comprising a first network operatively coupled to a second network, wherein the first network comprises a first security edge protection proxy element operatively coupled to a second security edge protection proxy element of the second network;
    at least one processor coupled to a memory and configured to:
    apply, at the first security edge protection proxy element, application layer security to one or more information elements in a received message from a network function before sending the message to the second security edge protection proxy element;

wherein applying the application layer security to the one or more information elements in the received message comprises applying different types of application layer security to different ones of the one or more information elements in the received message; and wherein applying different types of application layer security to different ones of the one or more information elements in the received message comprises (i) applying at least one of end-to-end encryption and a first type of end-to-end integrity protection to information elements of a first type and (ii) applying a second type of end-to-end integrity protection to information elements of the second type, the second type of end-to-end integrity protection permitting verifiable modification of the information elements of the second type by one or more authorized nodes in the second network.

14. The apparatus of claim 13, wherein the processor and memory are further configured to enable the first security edge protection proxy element to identify an indicator in the received message from the network function, wherein the indicator is set by the network function to specify at least one security operation to be applied to the one or more information elements.

15. The apparatus of claim 13, wherein the processor and memory are further configured to provision the first security edge protection proxy element with configuration information that enables the first security edge protection proxy element to self-identify at least one security operation to be applied to at least one information element in a received message.

16. The apparatus of claim 13, wherein the processor and memory are further configured to enable the first security edge protection proxy element to select a protection scheme based on the content of the one or more information elements.

17. The apparatus of claim 13, wherein the processor and memory are further configured to enable the first security edge protection proxy element to negotiate a security profile with the second security edge protection proxy element.

18. The apparatus of claim 13, wherein the processor and memory are further configured to enable the first security edge protection proxy element to perform key agreement operations with the second security edge protection proxy element to agree on one or more keys for application layer security.

19. The apparatus of claim 13, wherein the received message is a HyperText Transport Protocol (HTTP) request message.

20. The apparatus of claim 19, wherein a format of the HTTP request message utilizes a JavaScript Object Notation (JSON).

* * * * *